May 26, 1925.  1,539,652
W. J. DONOVAN
BARRIER FOR FERRIES, DRAWBRIDGES, AND THE LIKE
Filed Oct. 12, 1923  6 Sheets-Sheet 1

Inventor.
William J. Donovan
by Heard Smith & Tennant
Attys

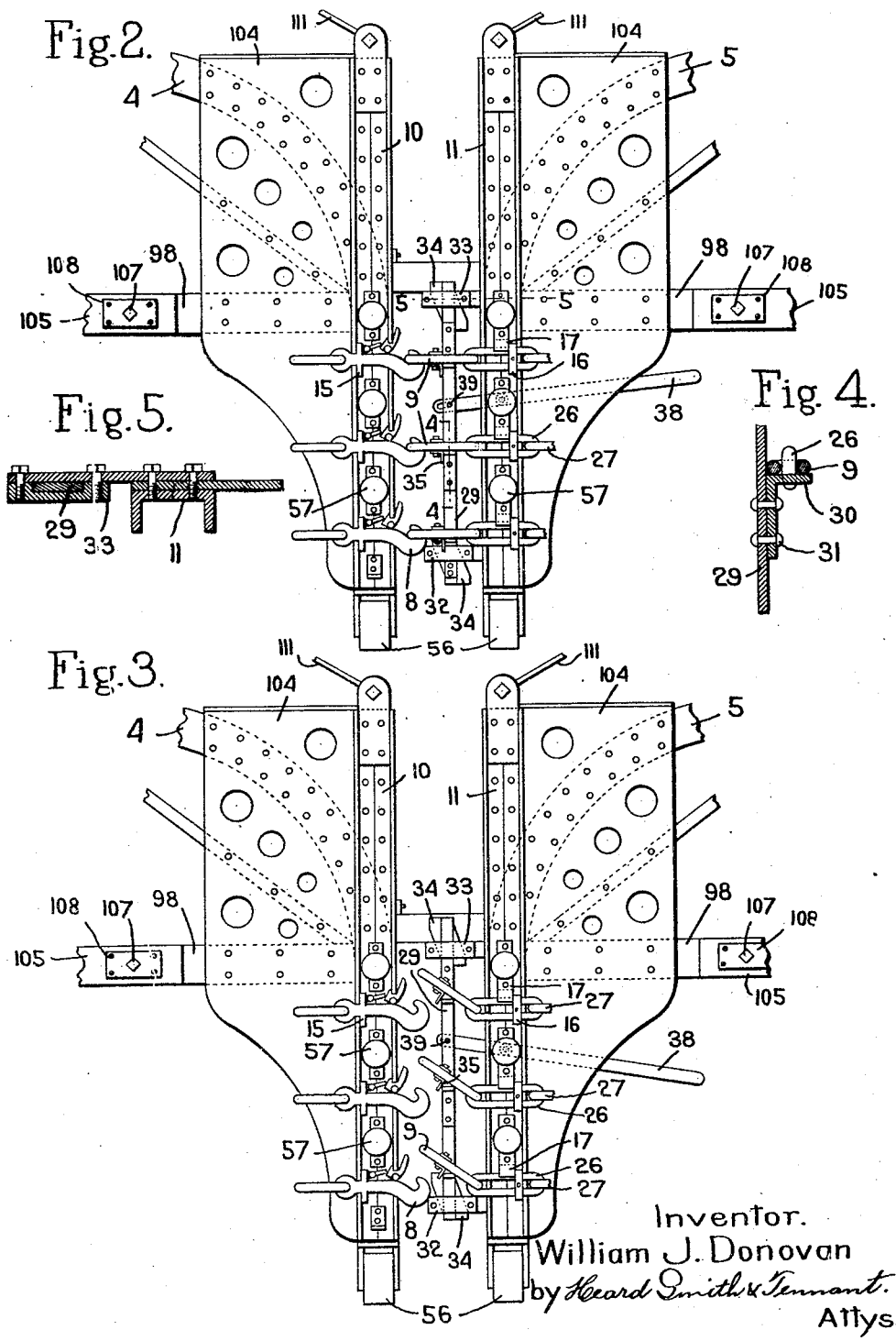

May 26, 1925.
W. J. DONOVAN
BARRIER FOR FERRIES, DRAWBRIDGES, AND THE LIKE
Filed Oct. 12, 1923    6 Sheets-Sheet 3
1,539,652
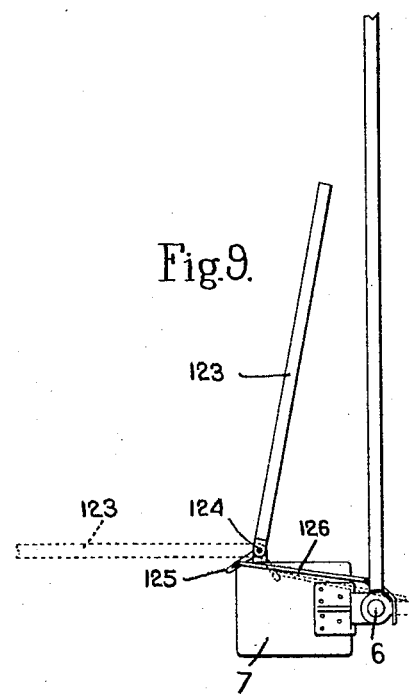
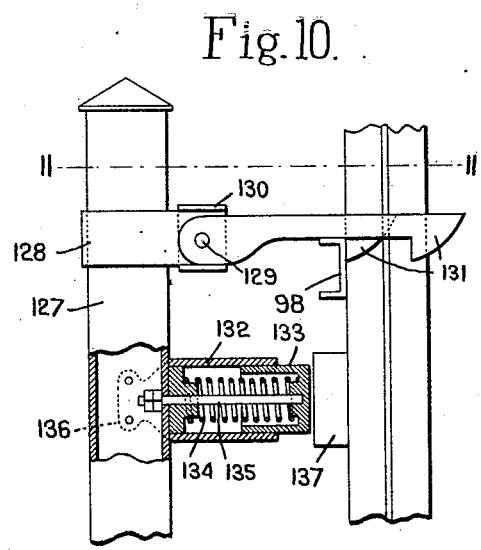
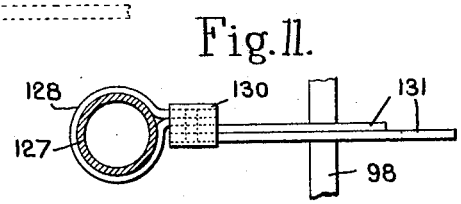
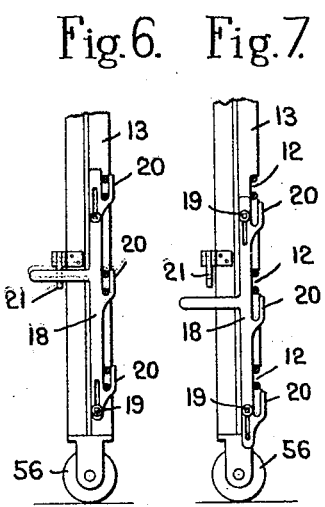
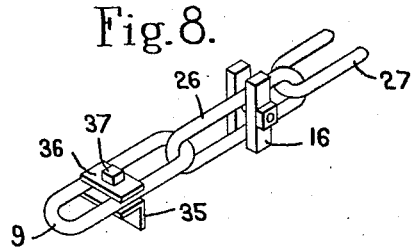
Inventor.
William J. Donovan
by Heard Smith & Tennant.
Attys.

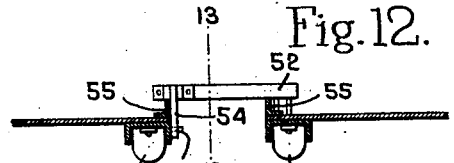
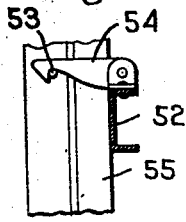
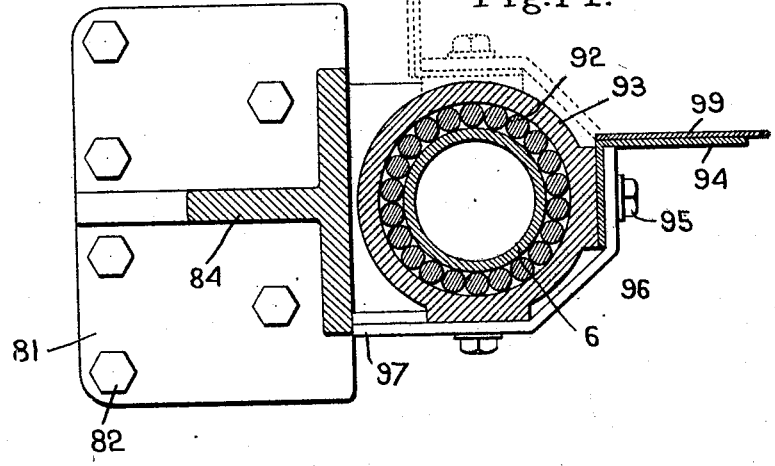
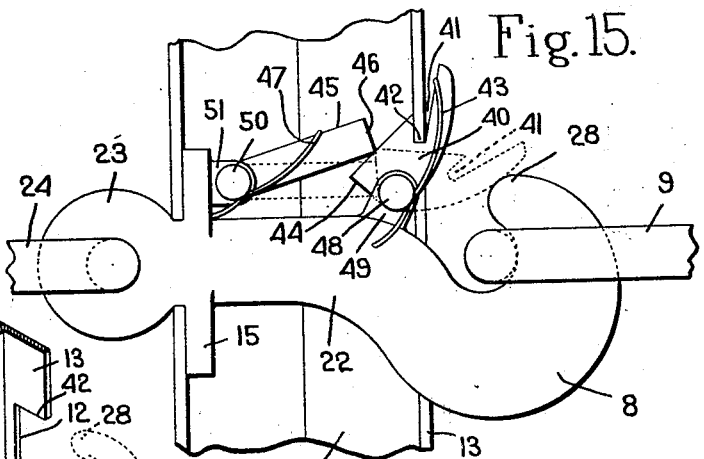
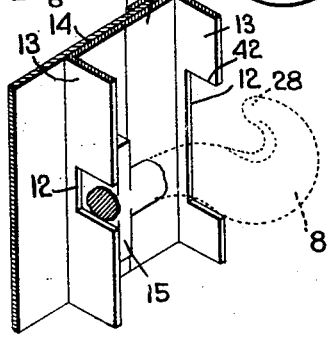
Inventor
William J. Donovan
by Heard Smith & Tennant
Attys.

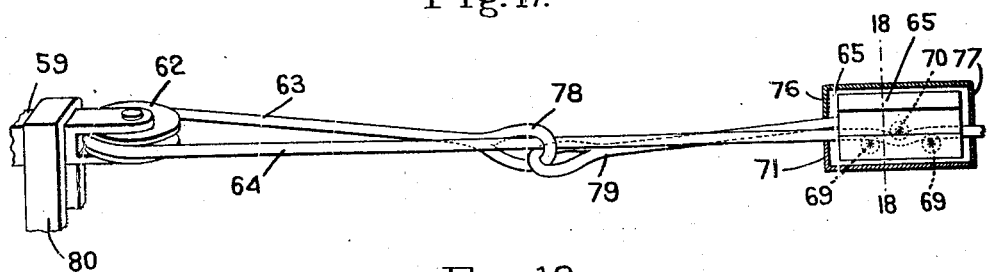
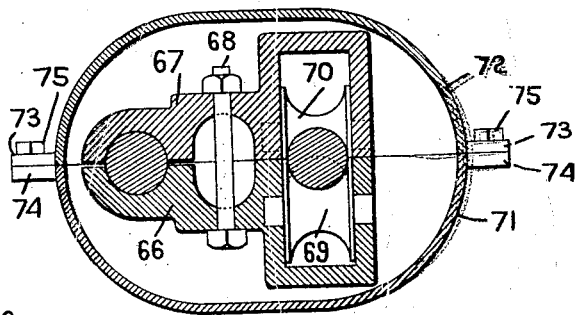
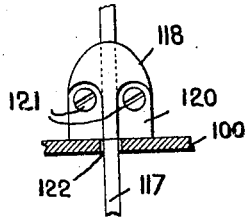
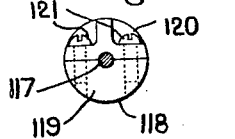
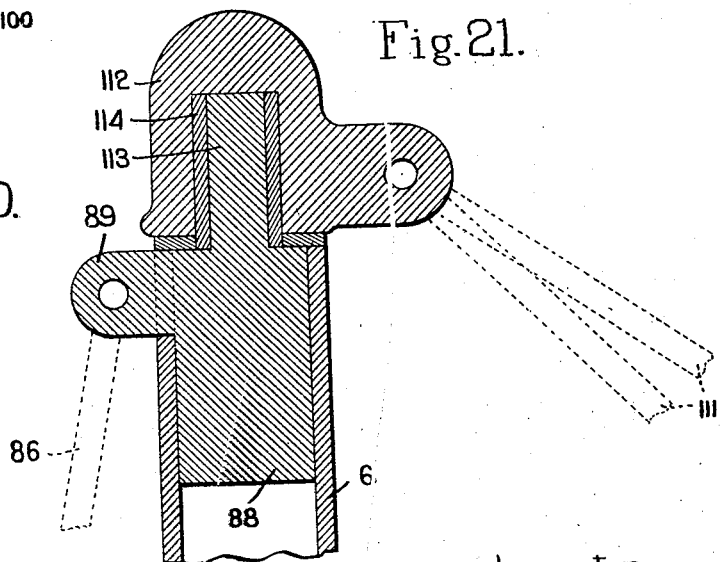

May 26, 1925.  1,539,652
W. J. DONOVAN
BARRIER FOR FERRIES, DRAWBRIDGES, AND THE LIKE
Filed Oct. 12, 1923  6 Sheets-Sheet 6

Inventor.
William J. Donovan
by Heard Smith & Tennant
Attys.

Patented May 26, 1925.

1,539,652

UNITED STATES PATENT OFFICE.

WILLIAM J. DONOVAN, OF EAST BOSTON, MASSACHUSETTS.

BARRIER FOR FERRIES, DRAWBRIDGES, AND THE LIKE.

Application filed October 12, 1923. Serial No. 668,238.

*To all whom it may concern:*

Be it known that I, WILLIAM J. DONOVAN, a citizen of the United States, and resident of East Boston, county of Suffolk, State of Massachusetts, have invented an Improvement in Barriers for Ferries, Drawbridges, and the like, of which the following description, in connection with the accompanying drawing, is a specification, like characters on the drawing representing like parts.

This invention relates to a barrier for closing the path on drawbridges, ferry boats and the like to stop the traffic when the drawbridge is open or to prevent the traffic from moving off the end of the ferry boat. The invention relates particularly to improvements in the barriers which were broadly described and claimed in my Patent, No. 1,437,404, granted December 5, 1922, and my co-pending application, Serial No. 527,898, filed January 9, 1922.

In the barriers described in the above mentioned patent and application, the barrier is in the form of a cable or chain stretched between two posts fastened on either side of the pathway. The barrier is in two sections which are removably connected at their inner ends and each section is supported by barrier supporting means which are pivoted at the posts so that they may swing to one side of the path when the path is opened. The barrier supporting means are preferably in the form of gates connected to the barrier in such a manner that upon being struck by a moving vehicle the gates may swing away from the barrier to prevent damage of the gates thereby leaving the barrier freely supported across the path to stop the moving vehicle.

In order to effectively and surely stop a vehicle such as a street car or auto truck which is moving at a high speed it is necessary that the barriers be very strong, with the result that they must be very heavy. It is also desirable that several barriers be used and placed at different heights above the path to insure that at least one of the barriers will engage with the vehicle.

One of the objects of the present invention is to provide a means whereby the heavy links which connect the barrier sections may be easily and quickly moved to connect or disconnect the said barrier sections and more particularly to provide such a device that all of the connecting links may be operated in unison.

A further object of the present invention is to provide a lock on the means connecting the barrier sections which operates when the gates are knocked away from the barrier to securely lock together the ends of the barrier sections.

The barrier of the present invention is designed for use where there is a path for vehicles and a separate path for pedestrians. In barriers of this type it is usual to rigidly connect the barrier for the foot path with the barrier for the vehicle path and consequently when the vehicle barrier swings in the direction of the vehicle traffic the pedestrian barrier swings against the direction of travel of the pedestrian traffic with the result that some of the pedestrians close to the gate are likely to be injured. It is an object of the present invention to so connect the pedestrian barrier with the vehicle barrier that both barriers swing in the direction of the travel of both kinds of traffic.

In the construction described in my above mentioned patent and application the barrier sections are connected to the posts at their outer ends by means of springs so that when a moving vehicle strikes the barrier the springs will operate to gradually bring the vehicle to rest. In the present invention, in addition to providing the springs, the barrier is connected to the posts by means of sheaves, the barrier being threaded around the sheaves with its end extending along the body of the barrier and fastened to a brake which frictionally engages the body of the barrier and co-operates therewith so that when the barrier is struck a severe blow it may gradually extend, but, while extending, offer resistance such that the vehicle is gradually brought to rest.

Another object of the invention is to so connect the end of the barrier with the body thereof that when the barrier has extended to the farthest extent permissible all movement of the barrier will cease and the vehicle will be brought to a complete stop.

Other objects and features of the invention are to generally improve the construction and operation of barriers for drawbridges, ferry boats and the like, and will more fully appear from the following description and accompanying drawings and will be particularly pointed out in the claims.

The drawings illustrate both in perspective, elevation and detail a preferred form of construction of a barrier for drawbridges, ferry boats and the like, and embody the broad principles of the invention.

In the drawings:

Fig. 2 is a detail of the means for connecting and supporting the barrier sections showing the inner ends of the barrier sections connected;

Fig. 3 is a detail of the means for connecting and supporting the barrier sections showing the inner ends of the barrier sections disconnected;

Fig. 4 is a partial section on line 4—4, Fig. 2;

Fig. 5 is a section on line 5—5, Fig. 2;

Fig. 6 shows a modified means for retaining the inner end of one of the barrier sections against the barrier supports, the means being in operative position;

Fig. 7 is a view similar to Fig. 6 showing the means for retaining the barrier against the barrier support in inoperative position;

Fig. 8 is a perspective showing details of the means for retaining the end of a barrier section against the barrier support and means for connecting the link which joins the inner ends of the barrier to the means which operates the link;

Fig. 9 is a diagrammatic view showing the manner of connecting the barrier support for the vehicle path with the barrier for the foot path so that they may operate together and swing in the direction of the traffic;

Fig. 10 is an elevation partially in section of the means to retain the barrier support and barrier in open position;

Fig. 11 is a section on line 11—11, Fig. 10;

Fig. 12 is a section through the inner ends of the barrier supports showing the means for connecting the barrier supports;

Fig. 13 is a section on line 13—13, Fig. 12;

Fig. 14 is a section on line 14—14, Fig. 1;

Fig. 15 is a detail of the means for connecting the inner ends of the barrier sections and means for locking the barrier sections in connected relation when the barrier supports are knocked away from the barriers;

Fig. 16 is a detail showing the manner of retaining the inner end of one of the barrier sections on the barrier suport;

Fig. 17 is a detail showing the manner of connecting a barrier section to the post and the means of connecting the end of the barrier section to the body thereof;

Fig. 18 is a section on line 18—18, Fig. 17;

Fig. 19 is a front elevation of the means for suspending the barrier from the barrier supports intermediate their ends;

Fig. 20 is a top view of the device shown in Fig. 19;

Fig. 21 is a section through the top of the mast from which the barrier supports are suspended;

As illustrated herein the barrier structure comprises the barrier sections 1, 2 and 3 which perform the function of stopping the vehicle and most therefore be of considerable weight when used to stop a heavy vehicle such as a truck or street car, and the barrier supports by which the barrier sections are supported. These barrier supports are indicated generally at 4 and 5 and are preferably in the form of gates hinged to and supported from masts 6 which are carried by and extend upwardly from posts 7 preferably situated on either side of the vehicle path and to which the outer ends of the barrier sections are connected.

Figure 1:
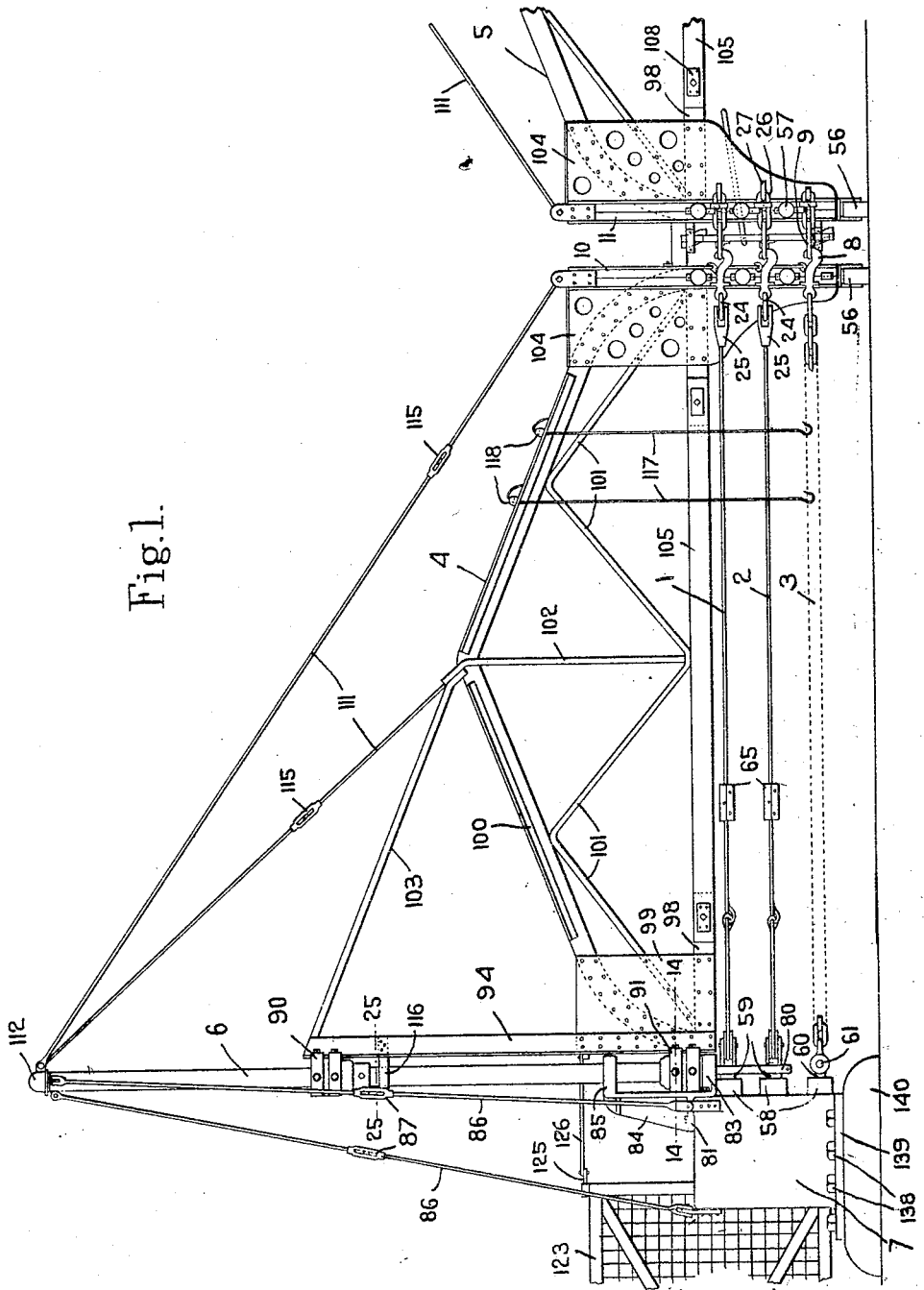
Fig. 1 is a partial front elevation showing one complete section of the barrier for the vehicle path and the means of connecting it to the other section for the vehicle path and to the barrier for the pedestrians' path.
Figure 22:
Fig. 22 is a plan view of the base girder of the gate and the buffer attached thereto.
Figure 23:
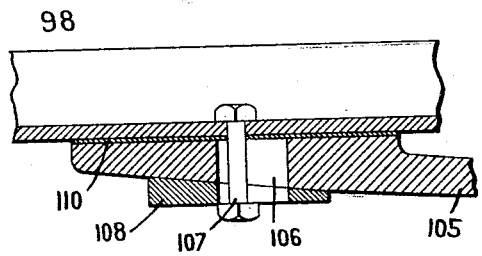
Fig. 23 is a sectional detail showing the means of securing the buffer to the girder.
Figure 24:
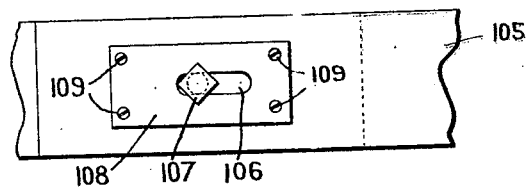
Fig. 24 is a front elevation of Fig. 23.
Figure 25:
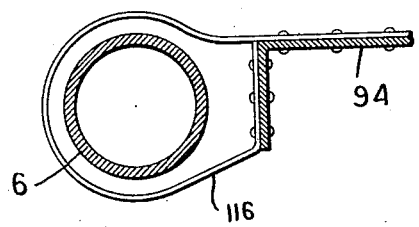
Fig. 25 is a section on line 25—25, Fig. 1.

For clearness in the drawings it has been considered desirable to show only a little more than half of the general barrier structure and it is therefore to be understood that barrier sections similar to the sections 1, 2 and 3 extend to the right on Fig. 1 and the barrier support or gate 5 is carried on a post and mast similar to the post 7 and mast 6.

The barrier sections are preferably of the number and form shown on the drawings, the barrier sections 1 and 2 being shown as cables and the barrier section 3 being shown as a heavy chain. It is deemed preferable to make the barrier sections in this manner and place them in the relation shown in order that the cables are placed above the roadway in such a position that they will engage a moving vehicle such as a wagon or a truck and the chain 3 is placed near the roadway in order that it may engage the wheels and frame of a street car between the wheels and the body of the car. The number or type of the barrier sections are not to be limited, however, to the showing made in the drawings. The barrier sections are connected at their inner ends by means of hooks 8 fastened to the inner ends of one set of barrier sections and connecting links 9 fastened to the inner ends of the opposite set of barrier sections. Due to the size and weight of the barrier sections and because of the strain to which said sections are subjected when struck by a swiftly moving heavy vehicle, the hooks 8 and connecting links 9 are necessarily very strong and heavy.

The inner ends of the barrier sections are supported on the inner ends of the barrier supports in such manner that the barrier sections may be freed from the barrier supports upon being struck by a moving vehicle. For this purpose the inner ends of the barrier supports are made in the form of upright channel irons 10 and 11, and grooves 12 are cut in the parallel webs or sides 13 of the irons from the outer edge thereof toward the base 14. It will be seen that when the barrier is struck by a moving vehicle the gates may be pushed away from the barrier sections the ends of which may be disconnected from the barrier supports by slipping out of the grooves.

In order to retain the ends of the barrier sections in position on the barrier supports but still permit the barrier sections to swing clear of the barrier supports, members 15 and 16 are fastened on the inner ends of the barrier sections in such positions that they engage with the webs 13 of the channel irons on the barrier supports, the tension and weight of the barrier sections pulling the members 15 and 16 against the webs 13 of the channel irons with sufficient force so that said members 15 and 16 are retained in position by friction.

In order to insure that the barrier sections are retained against the barrier supports spring clips 17 may be fastened in the channel irons in such position that the ends of the clips overlie a portion of the barrier section. It is obvious that when the barrier is struck the barrier sections may be pulled away from the barrier supports against the resistance of the clips 17 which will give sufficiently to permit such movement.

In Figs. 6 and 7 there are shown modified means for accomplishing the purpose of the spring clips 17. As shown in Figs. 6 and 7 a sliding member 18 is fastened by means of bolts 19 to a web 13 of the channel irons and carries fingers 20 so placed that they may move in front of a portion of the barrier section thereby retaining the barrier section between said fingers and the bottom of the groove 12. The sliding member is intended to be moved into the position shown in Fig. 6 with the fingers in front of the barrier section when the gates or barrier supports are swung open to permit traffic along the pathway, and is intended to be moved into the position shown in Fig. 7 with the fingers disengaged from contact with the barrier section when the gates are closed in order that the gates may swing free from the barrier section upon being struck. To retain the sliding member 18 in the position shown in Fig. 6 said member is provided with a handle which engages with a catch 21 supported on the channel iron. Although the fingers 20 are designed to retain the barrier section against the barrier support they are made of such a size that, should the operator forget to lower the sliding member 18 when the gates are closed and when in this position the barrier is struck, the fingers will break off and permit the gate to swing away from the barrier so as not to damage the gate.

As above mentioned, in order to connect the inner ends of the barrier sections, the inner end of one barrier section has been made in the form of a hook 8 having a shank 22 and an eye 23. The eye of the hook is connected by means of a link 24 to a swivel 25 which is firmly secured to the cable or other material which forms the body of the barrier section. The end of the other barrier section is made in the form of a link 26 which may be connected to the body of the barrier section in any suitable manner as by another link or swivel 27. The inner ends of the two barrier sections are connected by a connecting link 9 which is so positioned and is of such a size that it may slip over the point 28 of the hook when the inner ends of the barrier sections are correctly placed on the barrier supports.

An important feature of the present invention is the means whereby the heavy connecting links 9 which connect the barrier sections may be easily and quickly moved to connect or disconnect said barrier sections and more particularly to provide such a device that all of the connecting links may be operated in unison. For this purpose a bar 29 is carried by the inner end of the barrier support, preferably the channel iron 11, and has arms 30 projecting therefrom under each of the links 9. The arms may conveniently be angle irons and may be fastened to the bar 29 in any suitable manner such as by rivets 31. It is obvious that when the bar 29 is moved upwardly each of the links 9 is raised and has a tendency to disengage from the hook 8. In order to move the links 9 so that they will always slip over the point 28 of the hook when they are to be disengaged therefrom and to ensure that they will always properly seat in the hollow of the hook when the barrier sections are to be connected, the bar 29 is caused to operate through guides 32 and 33 in such a manner that while the bar has a vertical movement to lift the links 9 from the hook it also has a transverse movement which causes the links to move transversely so as to be entirely free from the point 28 of the hook while they are being raised. For this purpose the portions of the bar 29 which engage with the guides 32 and 33 is provided with cam portions 34 which are so placed that when the bar 29 is moved upwardly it also has a movement toward the shank 22 of the hook.

In order to ensure that the links 9 will have transverse movement with the bar 29 while the bar and links are being raised, each link is provided with a member 35 which engages with the arm 30 so that transverse movement of the bar 29 may be transmitted to the links. Each member 35 may be adjustably retained on the appropriate link by means of a plate 36 secured on the side of the link opposite from the member 35 by means of a bolt 37 which passes from the plate 36 between the parallel portions of the link and engages with a portion of the member 35. For this purpose the member 35 is preferably a section of angle iron. In order that the bar 29 may conveniently be raised to move all of the links 9 in unison a handle 38 is fulcrumed to the channel iron 11 and pivotally connected at 39 to the bar 29 so that the bar may have both the longitudinal and transverse movement heretofore mentioned.

In order to prevent all possibility of the ends of the barrier sections becoming disconnected when the gates swing away from the barrier sections I provide locking means operable when the barrier supports swing away from the barriers to lock the connecting means in position connecting the ends of the barriers. Such locking means is preferably a latch 40 carried by the hook to lock the link 9 in engagement with the hook when the barrier supports swing away from the barrier. The latch is pivoted to the hook and is formed with a groove 41 which, when the barrier section is connected to the barrier support, catches under an edge 42 of a web 13 of the channel iron 10 so that the latch is retained in such a position that the link 9 can freely be disconnected from the hook. When the barrier support swings free from the barrier section the latch 40 moves with the hook 8 away from the channel iron 10 and consequently the edge 42 is disengaged from the groove 41 with the result that the latch is free to close the opening between the shank 22 of the hook and the point 28 thereof. A spring 43 is placed in engagement with the latch 40 and the hook 8 in such manner that it constantly urges the latch toward the position closing the hook.

It can readily be appreciated that when the barrier is struck the barrier sections are subjected to severe stress and therefore there might be a tendency for the link to pull out of the hook over the point 28 thereof and the spring 43 might not be of sufficient strength to resists this tendency. To ensure that the link 9 will always remain engaged with the hook 9, the end 44 of the latch is squared and a keeper 45 is fastened to the hook so that when the latch is in position closing the hook, the end 46 of the keeper is in engagement with the squared end 44 of the latch thus securely closing the hook. It has been found convenient to pivot the keeper to the hook and provide the keeper with a spring 47 which will ensure that the keeper will move into operative position as soon as the latch closes the opening of the hook. The latch is preferably pivoted at 48 to a boss 49 which rises from the shank of the hook near the bend, and the keeper is pivoted at 50 to a similar boss 51 extending from the member 15 which may be fastened to or be a part of the hook.

It is desirable to have the gates which support the barrier sections so connected that both gates will swing away from the barrier when one of the gates is struck. The means for thus connecting the gates is shown in detail in Figs. 12 and 13. Said means comprises a bar 52 fastened in any suitable manner as by bolts or screws to the inner end of one of the gates 5 and of such a length that it extends past the inner end of the opposite gate 4. A short pin 53 extends from the gate 4 toward the gate 5 and a hook 54 is hinged to the bar 52 for hooking over the pin. If either gate is struck and swings open the other gate will be swung open also and the hook 54 will slip off of the pin 53 as the ends of the gates swing apart, the pin 53 being short enough to permit this. The bar 52 may be a section of angle or channel iron and other sections of angle iron 55 may be used to stiffen the structure. As an illustration of the operation of the means connecting the gates let it be supposed that the gate 5 is struck and swings open. The bar 52 moves with the gate 5 and the hook pulls open the gate 4. As the gates swing apart the hook slips off the end of pin 53, and each gate continues its motion until it is brought to rest by the retarding force of friction or other causes.

The inner ends of the gates are supported on rollers 56 which rest on the surface of the path and bumpers 57 are fastened to the inner ends of the gate to protect the means for connecting inner ends of the barrier sections should the barrier be struck at the center.

As above stated the barrier sections are connected at their outer ends to posts 7. This connection is made through yielding connections 58 of the type described in my hereinbefore mentioned patent and application. As a part of the yielding connections the arms 59 and 60 extend from the posts toward the barrier sections and the barrier sections are fastened at their outer ends to these arms. In the case of the chain 3 the outer end thereof is fastened to one of the arms by means of a hinged connection 61.

In the case of the cables 2 and 3, however, the cables are fastened to the arms 59 in such manner that when the cables are struck a severe blow they may gradually extend, all the while resisting such extension, thus gradually bringing to rest the vehicle which has struck the barrier. This is preferably accomplished by threading the end of the cable around a sheave 62 which is rotatably mounted in the end of each of the arms 59. This construction leaves a short inner end 63 of the cable which extends substantially parallel to the body 64. The short end of the cable is connected to a friction brake 65 which frictionally engages the body of the cable. Thus when the barrier is struck the cable is pulled around the sheave and the brake 65 is pulled along the body of the cable toward the sheave, all the while offering resistance to movement.

The brake may be made in any desired form but preferably comprises a frame having two parts 66 and 67 held together by one or more bolts 68 in order that the brake may be clamped around the body of the cable and to the short end thereof. The brake illustrated has two or more rolls 69 journalled in the part 66 of the frame and one or more rolls 70 journalled in the part 67 of the frame in such manner that the body of the cable when passing between the rolls must follow a tortuous path. It will be seen that when the brake is moved along the body of the cable more or less resistance is offered to such movement depending upon the path which the cable must follow and the resistance of the cable in following such path. With a stiff wire cable threaded as shown in Fig. 17 of the drawings a very efficient brake is provided which effectively resists the movement along the body of the cable although such movement is permitted without danger to the cable or the brake. If the cable be threaded about the rolls 69 and 70 in another way it is obvious that a greater braking force may be obtained.

A casing preferably surrounds the brake to protect the brake from the weather and to hold grease or other lubricant. The casing may conveniently comprise two similar shells 71 and 72 having apertured lugs 73 and 74 projecting therefrom with which bolts or screws 75 co-operate to hold the two shells against one another. The shells have ends 76 and 77 with openings therein of such a size that they closely embrace the cable but still permit the free movement of the cable through the openings. The end 76 of the casing preferably has two openings to permit the passage therethrough of the body 64 of the cable and the short end 79, while the end 77 of the casing has only one opening to permit the passage therethrough of the cable body. The casing is intended to be entirely filled with grease which will prevent air or moisture from coming in contact with the parts of the brake and rusting said parts and in addition the axles of the pulleys 69 and 70 will always be thoroughly lubricated so that they will operate perfectly even though called upon to function only once in a great while.

It is important that although the cable be allowed to extend a certain distance it shall not be permitted to extend to such a distance that the vehicle which strikes the barrier may run off the end of the bridge or ferry boat if the barrier be used in such places. In order to limit the distance to which the barrier may extend a loop 78 may be formed on the end of the cable and enclose the body thereof. The loop is connected by a short section of cable 79 to the brake 65. When the cable is struck the brake is pulled along the body of the cable but when the loop 78 has been pulled against the sheave 62 it is readily seen that further extension of the cable is prevented and the vehicle is brought to a complete stop. In order to ensure the operation of the sheaves at all times and to prevent them from twisting when the cable is under stress the arms 59 are preferably squared and a strap 80 engages the squared sides of the arms to prevent the arms from rotating.

The barrier supports or gates may have any suitable form and may be supported on the posts in any suitable manner. At present the construction illustrated in the drawings is deemed preferable. The gates are supported on masts 6 which in turn are supported by the posts 7 as hereinbefore mentioned. In order to support the mast and keep it in its correct position a plate 81 is fastened in any suitable manner, as by bolts 82, to the posts. The plate is made with an arm having a cup 83 in which the bottom of the mast is held. An upright arm 84 rises from the plate and a horizontal portion thereof forms a collar 85 which surrounds the mast to retain it in its correct position. The mast is braced by guy cables 86 having turn-buckles 87 therein by means of which the cables may be tightened. The mast may conveniently be a tube or pipe in order to make it light in weight and the guy cables are connected thereto by means of a fitting having a portion 88 which extends into the pipe and ears 89 extending therefrom to which the upper ends of the guy cables 86 are fastened. The mast does not revolve when the gates are moved but the gates are hinged to the mast by means of roller bearings 90 and 96 at the top and bottom of the gate respectively. The rollers of the bearings are shown at 92, Fig. 14, and are surrounded by a casing 93 to which an upright 94 of the gate is connected by any suitable means as bolts 95. In order to stop the gate in its correct position when it is swung to close the path, a strap 96 is fastened to the casing with its end 97 in such a position that it engages a portion of the plate 81 to limit the movement of the gate.

The gates may have any suitable form but are preferably made as shown in the drawings. The structure illustrated has been found to possess the required strength and yet be as light in weight as is consistent with the strength required. The bottom of the gate consists of a base girder 98. A plate 99 is fastened to the upright 94 and the girder 98. Fastened to the plate and extending therefrom are the top girder 100 and the struts 101. The top girder extends entirely across the gate and is joined at the inner end to the bottom girder 98. A brace 102 joins the top and bottom girders at approximately the center of the gate. A diagonal brace 103 is fastened at one end to the top bearing 90 and at the other end to the center of the top girder 100 in order to further support the gate. Inner bracing plates 104 are fastened as shown to the bottom girder 98, top girder 100, and struts 101. These bracing plates also serve as a means to carry the channel irons 10 and 11.

To protect the gates and take the shock when they are struck, a buffer is fastened to each gate. The buffer is preferably a heavy plank 105, fastened at its ends against the base girder 98. The plank is preferably arcuate in shape so that it stands away from the base girder at all points except at its ends, the girder forming the chord of the arc. The ends of the plank are fastened against the girder in such a way that when the plank is struck it may flatten against the girder, the ends of the plank sliding along the girder toward the ends thereof. For this purpose slots 106 are cut near the ends of the plank and bolts 107 pass through the girder and through the slots. Metal plates 108 cover the ends of the plank adjacent the slots to prevent the heads of the bolts 107 digging into the wood of the plank and also to present a hard surface which may slide along the bolt head when the end of the plank moves. The plates 108 are preferably fastened to the plank by means of screws 109 and are slotted to correspond with the slots 106. Other metal plates 110 lie between the plank 105 and the girder 98 to give a bearing surface. The plates 110 are preferably of rust-proof material and have the flat surface next to the plank finished off so that the plank may slide easily along it.

In order to strengthen the gate and keep it in its correct position guy cables 111 run from the gate as shown in the drawings to a cap 112 rotatably mounted on the top of the mast. The fitting at the top of the mast is provided with an upright pin 110 surrounded by a bearing metal 114 which fits into a hollow formed in the cap 112 thereby retaining the cap on the gate but permitting the cap to rotate with the gate. The guy cables 111 may be provided with turnbuckles 115 in order that the guy cables may be tightened.

If, when the gates are open and traffic passing, a vehicle with a high or overhanging load passes, it is possible that the side of the truck or its load may strike the upright 94 and break the upper bearing, pulling the upper part of the gate away from the mast 6. To prevent the upper part of the gate from entirely leaving the mast should the upper bearing be broken, a strong iron strap 116 is fastened to the upright 94 as shown in Fig. 1 and encircles the mast but is spaced therefrom so that it normally does not touch the mast and in no way influences the operation of the gates. The strap 116 is purely an emergency device.

The chain 3 which constitutes the bottom barrier is extremely heavy and in order to keep it from sagging into such a position that it would be too low to engage with a moving vehicle and also in order to prevent too great a strain from being exerted on the bottom of the channel irons 10 and 11, the chain is supported intermediate of its ends by a plurality of cables 117 having hooks on their lower ends which hook in the links of the chain. The cables may conveniently be supported from the top girder 100. It is necessary that these cables be so supported on the top girder that when the barrier is struck and the gates swing away from the barrier, the cables may extend so as not to raise the chain or prevent the gates from swinging. For this purpose the cables 117 run through the friction blocks 118 on the top girder 100. Any suitable friction block may be used. The preferred block is shown in the drawings, and comprises two parts 119 and 120 held together by means of screws 121 in such manner that the cable 117 may be adjustably clamped between the parts of the block. The cable runs through an opening 122 in the top girder and the friction blocks may simply rest on the upper side of the girder without being fastened thereto.

The barrier of the present invention is designed for use where there is a path for vehicles and a separate path for pedestrians. It is desirable that both of the barriers swing in the direction of travel of the traffic when they are being opened. In order to accomplish this the barrier 123 which closes the foot path is hinged to the post 7 at 124 and is provided with an arm 125 extending on the opposite side of the link. A connecting bar 126 connects the arm 125 to the gate 1. With this arrangement both gates swing in the same direction.

In order to retain the gate in its open position a retaining post 127 is fixed in a suitable position to the side of the path and a catch is hinged thereto in such position that the end of the catch hooks over the bottom girder 98 of the gate when it is swung open. The catch may conveniently be fastened to the post by means of a collar 128 which is clamped around the post and has a portion extending away therefrom to which the catch is hinged at 129. A band 130 surrounds the collar and hinge and is of such a size and so positioned that it retains the catch in a substantially horizontal position to engage the bottom girder of the gate and also prevents the catch being thrown so far upwardly when the gate strikes the post that the gate rebounds before the catch can engage said bottom girder. The catch is preferably made of a plurality of hooks 131 at different distances from the post because when the gate is opened it swings with considerable force and when it strikes the side of the path it usually rebounds. The plurality of hooks, therefore, are used so that if an inner hook does not catch over the bottom girder, one of the outer hooks will be certain to do so and thus retain the gate in its open position.

To prevent the rebound as far as possible the post is provided with a yielding stop comprising an outer casing 132 in which moves an inner casing 133. A spring 134 is located within the two casings and serves to take the shock when the gate swings against the stop. A rod 135 fastened to the inner casing and extending through the post serves to retain the inner casing in its correct position, and keep it from being forced out of the outer casing under the influence of the spring 134. The stop is supported on the posts by means of ears 136 which are fastened to the posts in any suitable manner. In order to assist the stop in checking the movement of the gate a buffer 134 is fastened to the gate for engagement with the inner casing of the stop.

The posts 7 may be fastened to the side of the path in any suitable manner as by bolts 138 co-operating with a base plate 139. The bolts are fastened in any suitable manner to a base 140 which rises from the level of the path.

Assuming that the barrier is closed in the position shown in Fig. 1 and shown in detail in Fig. 2, if it is desired to open the barrier the operator simply pushes down on the handle 38 which raises the links 9 to disconnect the inner ends of the barrier sections and then pushes the gates open. The barrier 123 for the foot path opens in the same direction as the gates, that is, in the direction of travel of the traffic. When it is desired to close the barrier the gates 1 and 2 are simply pushed into the closed position and automatically stop with their inner ends opposite one another due to the engagement of the end 97 of the strip 96 with the plate 81. To connect the barrier sections the operator simply raises the handle 38 thus causing the links 9 to drop into place.

If the barrier is struck the gates 1 and 2 swing away from the barrier sections and the latches 40 operate to retain the links 9 in the hooks 8 thus securely connecting the barrier sections. At the same time the cables 114 move through the friction blocks 118 permitting the gates freely to swing away from the barrier sections. If the moving vehicle is not stopped by the impact with the barrier sections and gates, the yielding connections 58 operate to resist the progress of the vehicle. If the vehicle is moving with such force that the connections 58 yield to their limit the friction brakes 65 operate to permit the cables 1 and 2 to extend while offering a great resistance to the movement of the vehicle. The cables extend until the loops 78 engage with the sheaves 62 at which time further movement of the cables is prevented and the vehicle is brought to a dead stop.

The parts of the barrier may be of any size and the cables 1 and 2 and chain 3 are heavy enough to stop any vehicle. The chain 3 is of such strength that it will stop a street car within the space allowed by the yielding of the connections 58. With a high wheeled vehicle such as a wagon or carriage, however, the wheels may roll over the chain 3 and therefore the cables 1 and 2 have been provided which are of such a height that they will engage and stop the wagon or other high vehicle in the manner described. Although a particular and preferred form of the invention has been described modifications may be made and the invention is to be construed as broadly as the limitations in the claims, taken in conjunction with the prior art, may allow.

Having thus described the invention, what is claimed as new and desired to be secured by Letters Patent, is:

1. In a barrier for closing the path on drawbridges, ferry boats and the like, the combination with two posts on either side of the path, of a flexible barrier comprising two sections suspended from the posts at their outer ends with their inner ends adjacent one another, a hook fastened to the inner end of one section, a link fastened to the inner end of the other section for removable engagement with said hook, and means operable to move said link longitudinally along the hook until the link is free from the point thereof and then to move the link away therefrom, thereby to disconnect the link from engagement with the hook.

2. In a barrier for closing the path on drawbridges, ferry boats and the like, the combination with two posts on either side of the path, of a flexible barrier comprising two sections suspended from the posts at their outer ends with their inner ends extending toward one another, barrier-supporting means swingably supported by said posts and supporting the inner ends of the barrier sections adjacent one another, means removably connecting the inner ends of the barriers, and means carried by the barrier-supporting means operable to remove said connecting means thereby to disconnect the inner ends of the barrier sections.

3. In a barrier for closing the path on drawbridges, ferry boats and the like, the combination with two posts on either side of the path, of a flexible barrier comprising two sections suspended from the posts at their outer ends with their inner ends extending toward one another, barrier-supporting means swingably supported by said posts and supporting the inner ends of the barrier sections adjacent one another, a hook fastened to the inner end of one of the barrier sections, a link fastened to the inner end of the other of the barrier sections for removable engagement with said hook, and means carried by the barrier-supporting means operable to remove said link from the hook thereby to disconnect the inner ends of the barrier sections.

4. In a barrier for closing the path on drawbridges, ferry boats and the like, the combination with two posts on either side of the path, of a flexible barrier comprising two sections suspended from the posts at their outer ends with their inner ends extending toward one another, barrier-supporting means swingably supported on said posts, a hook fastened to the inner end of one of the barrier sections, a link fastened to the inner end of the other of the barrier sections for removable engagement with said hook, and means carried by the barrier-supporting means operable to move said link longitudinally along the hook until the link is free from the point thereof and then move the link away therefrom, thereby to disconnect the link from engagement with the hook.

5. In a barrier for closing the path on drawbridges, ferry boats and the like, the combination with two posts on either side of the path, of a flexible barrier comprising two sections suspended from the posts at their outer ends with their inner ends extending toward one another, barrier-supporting means swingably supported by said posts extending parallel to the barrier sections and supporting the inner ends of the barrier sections adjacent one another, a hook fastened to the inner end of one of the barrier sections, a link fastened to the inner end of the other of the barrier sections for removable engagement with said hook, a guide carried by the barrier-supporting means, a bar mounted in the guide for both transverse and longitudinal movement, and an arm carried by the bar for supporting the link, whereby when the bar is moved in one direction the transverse movement of the bar frees the link from the point of the hook and the longitudinal movement of the bar moves the link away from the hook.

6. In a barrier for closing the path on drawbridges, ferry boats and the like, the combination with two posts on either side of the path, of a flexible barrier comprising two sections suspended from the posts at their outer ends with their inner ends extending toward one another, means removably connecting the inner ends of the barrier sections, barrier supports swingably carried by said posts and supporting said connecting means in such manner that upon being struck by a moving vehicle the barrier supports may swing away from the barriers, and locking means operable when the barrier supports swing away from the barrier to lock the connecting means in position connecting the ends of the barriers.

7. In a barrier for closing the path on drawbridges, ferry boats and the like, the combination with two posts on either side of the path, of a flexible barrier comprising two sections suspended from the posts at their outer ends with their inner ends extending toward one another, a hook fastened to the inner end of the barrier sections, a link fastened to the inner end of the other of the barrier sections for engagement with said hook, barrier supports swingably carried by said posts and supporting the hook and link in such manner that upon being struck by a moving vehicle the barrier supports may swing away from the barriers and a latch carried by the hook to lock said link in engagement with the hook when the barrier supports swing away from the barrier.

8. A device of the type recited in claim 7 in which the latch is controlled by the barrier supports to automatically lock the link in the hook when the barrier support swings away from the barrier.

9. In a barrier for closing the path on drawbridges, ferry boats and the like, the combination with two posts on either side of the path, of a flexible barrier comprising two sections suspended from the posts at their outer ends with their inner ends extending toward one another, means removably connecting the inner ends of the barrier sections, barrier supports swingably carried by said posts at their outer ends with their inner ends adjacent the inner ends of the barrier sections, means on the inner ends of the barrier sections for co-operation with the inner ends of the barrier supports to prevent movement of the inner ends of the barrier sections toward the posts, and means carried by the inner ends of the barrier supports to retain the inner ends of the barrier sections against the inner ends of the barrier supports.

10. In a barrier for closing the path on drawbridges, ferry boats and the like, the combination with two posts on either side of the path, of a flexible barrier comprising two sections suspended from the posts at their outer ends with their inner ends extending toward one another, a hook fastened to the inner end of one of the barrier sections, an eye fastened to the inner end of the other of the barrier sections, barrier supports swingably carried by said posts at their outer ends with their inner ends adjacent the inner ends of the barrier sections, a web extending from the inner end of each barrier support across the barrier section and having a groove extending inwardly from the edge of the web to receive the hook and eye respectively, whereby when the barrier and barrier support are struck the barrier sections may slip out of the grooves to permit the barrier supports to swing away from the vehicle.

11. In a barrier for closing the path on drawbridges, ferry boats and the like, the combination with two posts on either side of the path, of a flexible barrier comprising two sections suspended from the posts at their outer ends with their inner ends extending toward one another, a hook fastened to the inner end of one of the barrier sections, an eye fastened to the inner end of the other of the barrier sections, barrier supports swingably carried by said posts at their outer ends with their inner ends adjacent the inner ends of the barrier sections, a web extending from the inner end of each barrier support across the barrier section and having a groove extending inwardly from the edge of the web to receive the hook and eye respectively, a plate carried by the hook for engagement with the web adjacent the hook, and a transverse member carried by the eye for engagement with the web adjacent the eye to prevent movement of the inner ends of the barrier sections toward the posts.

12. In a barrier for closing the path on drawbridges, ferry boats and the like, the combination with two posts on either side of the path, of a flexible barrier comprising two sections suspended from the posts at their outer ends with their inner ends extending toward one another, a hook fastened to the inner end of one of the barrier sections, an eye fastened to the inner end of the other of the barrier sections, barrier supports swingably carried by said posts at their outer ends with their inner ends adjacent the inner ends of the barrier sections, a web extending from the inner end of each barrier support across the barrier section and having a groove extending inwardly from the edge of the web to receive the hook and eye respectively, a finger connected to the web adjacent the eye for movement against the eye to retain the eye against the end of the barrier support.

13. In a barrier for closing the path on drawbridges, ferry boats and the like, the combination with two posts on either side of the path, of gates swingably carried by said posts at their outer ends with their inner ends adjacent one another, a pin projecting from the inner end of one gate, a bar projecting from the inner end of the other gate past the inner end of the first mentioned gate, and a hook extending from said bar for hooking over said pin whereby the gates are normally held shut but when struck they may swing open, and when one gate is struck its movement opens the other gate.

14. In a barrier for closing the path on drawbridges, ferry boats and the like, the combination with two posts on either side of the path, of a sheave secured to one of the posts, a flexible barrier comprising two sections detachably connected at their inner ends with the body of one of the barrier sections bent around the sheave forming a short end, and a retarding means co-operating with the short end of the barrier section to retard its movement around the sheave.

15. In a barrier for closing the path on drawbridges, ferry boats and the like, the combination with two posts on either side of the path, of a sheave secured to one of the posts, a flexible barrier comprising two sections detachably connected at their inner ends with the body of one of the barrier sections bent around the sheave forming a short end, a friction retarding means fastened to the short end of the barrier section and frictionally engaging the body of the barrier section to retard its movement around the sheave.

16. In a barrier for closing the path on drawbridges, ferry boats and the like, the combination with two posts on either side of the path, of a sheave secured to one of the posts, a flexible barrier comprising two sections detachably connected at their inner ends with the body of one of the barrier sections bent around the sheave forming a short end, a friction retarding means fastened to the short end of the barrier section, comprising a frame, and offset rollers engaging the body of the barrier section which is threaded between the rollers to retard the movement of the barrier section.

17. In a barrier for closing the path on drawbridges, ferry boats and the like, the combination with two posts on either side of the path, of a sheave secured to one of the posts, a flexible barrier comprising two sections detachably connected at their inner ends with the body of one of the barrier sections bent around the sheave forming a short end, a loop through which the body of the cable passes formed on the short end of the section and a retarding means co-operating with the short end of the barrier section whereby the movement of the barrier section around the sheave is retarded and when the loop engages with the sheave further movement is prevented.

18. In a barrier for closing the path on drawbridges, ferry boats and the like, the combination with two posts on either side of the path, of a sheave secured to one of the posts, a flexible barrier section supported by the posts with one end bent around the sheave forming a short end, a retarding means fastened to the said short end and engaging the barrier section intermediate of the posts to retard the movement of the barrier section around the sheave and a casing surrounding said retarding means.

19. In a barrier for closing the path on drawbridges, ferry boats and the like, the combination with two posts on either side of the path, of a sheave secured to one of the posts, a flexible barrier section supported by the posts with one end bent around the sheave forming a short end, a friction brake fastened to said short end comprising a frame and offset rollers having the barrier section threaded therebetween acting to retard extension of the barrier section, and a casing surrounding said brake to protect the brake and to hold the lubricant therefor.

20. In a barrier for closing the path on drawbridges, ferry boats and the like, the combination with two posts on either side of the path, of a flexible barrier suspended between the posts, barrier supporting means to support the barrier intermediate of the posts, and an elongated buffer fastened to the barrier supporting means to receive the blow when the supporting means is struck, said buffer being yieldable transversely of the barrier supporting means and extensible longitudinally as it yields.

21. In a barrier for closing the path on drawbridges, ferry boats and the like, the combination with two posts on either side of the path, of a flexible barrier suspended between the posts, a barrier support supporting the barrier intermediate of the posts and automatically disconnectable from said barrier when struck, an elongated buffer fastened to the barrier support projecting in front of the barrier to receive the blow when the support is struck and to force the support away from the barrier, said buffer being yieldable transversely of the barrier support and extensible longitudinally as it yields.

22. In a barrier for closing the path on drawbridges, ferry boats and the like, the combination with two posts on either side of the path, of a flexible barrier suspended between the posts, a barrier support supporting the barrier intermediate of the posts and automatically disconnectable from the barrier when struck, an elongated longitudinally extensible bowed buffer yielding transversely of the support and fastened at its ends to the support with the bow projecting in front of the barrier so that it may flatten against the support when struck and force the support away from the barrier.

In testimony whereof, I have signed my name to this specification.

WILLIAM J. DONOVAN.